United States Patent [19]

Lukes et al.

[11] 3,954,552

[45] May 4, 1976

[54] REMOVAL OF SODIUM CHLORIDE FROM PULP MILL SYSTEMS

[75] Inventors: Jerome A. Lukes, Ogden; Robert P. Schroeder, Salt Lake City, both of Utah

[73] Assignee: Erco Envirotech Ltd., Islington, Canada

[22] Filed: Aug. 5, 1974

[21] Appl. No.: 495,088

[52] U.S. Cl. .................................. 162/17; 162/19; 162/30 K; 162/89; 162/DIG. 8; 23/303; 423/207; 423/499
[51] Int. Cl.² ..................... D21C 3/02; D21C 11/04
[58] Field of Search ............... 162/17, 29, 30, 36, 162/88, 89, DIG. 8, 19, 29; 423/183, 184, 207, 421, 499, 205, 208; 23/297, 299, 302, 303

[56] References Cited
UNITED STATES PATENTS

| | | | |
|---|---|---|---|
| 1,791,281 | 2/1931 | Morse | 423/184 X |
| 2,642,399 | 6/1953 | Aries et al. | 252/183 |
| 2,862,887 | 12/1958 | Boyer | 252/183 |
| 3,560,329 | 2/1971 | Nelson et al. | 162/30 |
| 3,698,995 | 10/1972 | Raysson | 162/DIg. 8 |
| 3,746,612 | 7/1973 | Raysson et al. | 162/30 |
| 3,755,068 | 8/1973 | Raysson | 162/30 |
| 3,909,344 | 9/1975 | Lukes | 162/30 |

FOREIGN PATENTS OR APPLICATIONS

| | | | |
|---|---|---|---|
| 2,159,935 | 6/1973 | France | 162/DIG. 8 |
| 928,008 | 6/1973 | Canada | 162/DIG. 8 |

*Primary Examiner*—S. Leon Bashore
*Assistant Examiner*—Peter F. Kratz
*Attorney, Agent, or Firm*—Shoemaker and Mattare, Ltd.

[57] ABSTRACT

Smelts produced in spent pulping liquor recovery operations and containing sodium chloride are treated to remove sodium chloride therefrom in pure form while the loss of usable components is avoided. A solid mixture of sodium chloride, sodium carbonate and sodium sulphate is provided as such in a soda mill, or first is separated from sodium sulphide, by fractionating the smelt where sodium sulphide is present, as in the Kraft mill. The solid mixture is leached at a high temperature to remove all the sodium chloride values therefrom, along with part of the sodium carbonate and sodium sulphate. Pure sodium chloride is deposited by cooling the leach liquor and the mother liquor is recycled to the leaching step.

31 Claims, 4 Drawing Figures

REMOVAL OF SODIUM CHLORIDE FROM PULP MILL SYSTEMS

FIELD OF INVENTION

The present invention is directed to the removal of sodium chloride from pulp mill operations.

BACKGROUND TO THE INVENTION

In a liquid-effluent-free pulp mill, bleach plant effluent, containing sodium chloride values from chlorine-containing spent bleaching chemicals typically chlorine, chlorine dioxide, chlorine monoxide and sodium hypochlorite, and soda values from spent caustic extraction chemicals, typically sodium hydroxide used in the bleaching and purification procedures of the bleach plant, is discharged to the spent pulping liquor recovery and regeneration operation of the pulping process producing the pulp for bleaching and purification.

Typically such recovery and regeneration operation involves burning of the liquors to remove carbonaceous materials and to form a mixture of chemicals reusable as or convertible into pulping chemicals for recycle. Since sodium chloride is unaffected chemically by the recovery and regeneration operation, it would remain as a dead load in the effluent-free pulp mill and build up in the system unless steps are taken to remove the same.

The effluent-free pulp mill may be used with the Kraft process wherein sodium hydroxide and sodium sulphide are used as the pulping chemicals. Sodium sulphate or other sodium- and sulphur-chemical is added to the spent pulping liquor to make up losses of sodium and sulphur from the system and the recovery and regeneration operation produces in the burning or furnacing step a smelt containing mainly sodium sulphide and sodium carbonate which later is converted to sodium hydroxide, together with small amounts of sodium sulphate and other sodium sulphur-oxygen compounds. This smelt also contains sodium chloride in the effluent-free mill procedure.

The present invention is directed to the removal of sodium chloride in pure form from a sodium sulphide-, sodium carbonate-, sodium chloride- and sodium sulphate-containing smelt without removing the usable chemicals. Procedures for achieving sodium chloride removal from the smelt are described in copending application Ser. No. 420,876 now Pat. No. 3,909,344 filed Dec. 3, 1973, by Jerome A. Lukes and copending application Ser. No. 494,898, filed concurrently herewith, by Douglas W. Reeve (J20).

Canadian Patent 928,008 also describes a procedure for the removal of sodium chloride from a sodium sulphide-, sodium carbonate- and sodium chloride-containing smelt involving first leaching sodium sulphide from the smelt at a temperature above 50°C followed by separation of sodium chloride from the sodium sulphide-free smell at a temperature below 20°C.

Problems exist with this procedure, however. Thus, under the conditions of operation, the sodium chloride is obtained as an aqueous solution which, of necessity, must contain some dissolved sodium carbonate. This prior art suggests discarding the sodium chloride solution, thereby discarding some of the valuable sodium carbonate values.

In addition, by operating at temperatures below 20°C to remove sodium chloride as an aqueous solution and leave sodium carbonate free from sodium chloride, the sodium carbonate is in the form of the decahydrate. The water bound in this way introduces overall water balance problems.

The separation of sodium chloride by the utilizaton of temperatures below 20°C to precipitate sodium carbonate decahydrate involves the use of considerable quantities of energy to cool the solution and to form the decahydrate.

The present invention seeks to overcome these problems of this prior art by recovering pure sodium chloride in solid form, avoiding loss of sodium carbonate, maintaining the sodium carbonate in a form which avoids any substantial upsetting of water balance and consumes considerably less energy.

The principles of the invention are applicable to other pulp mill operations in addition to the Kraft mill process which utilize sodium sulphide or in which aqueous sodium sulphide is produced as an intermediate product. Typical of such additional processes are high yield pretreatment Kraft, polysulphide, alkafide and sodium-based sulphite processes.

The effluent-free pulp mill also may be used in a soda mill where sodium hydroxide is used as the active pulping chemical. The furnacing in the recovery and regeneration operation results in a smelt which contains sodium carbonate and sodium chloride.

The smelt also usually contains small quantities of sodium sulphate and other sodium- and sulphur-oxygen salts arising from the furnace fuel oil, the wood and from sodium sulphate-contaminated make-up chemicals.

The present invention is also directed to the recovery of sodium chloride in substantially pure solid form without loss of usable chemicals from the sodium carbonate-, sodium chloride- and sodium sulphate-containing smelt of a soda mill.

While the present invention will be described more particularly with reference to the presence of sodium chloride in the smelt arising from bleach plant effluents, the sodium chloride may arise from other sources, singly or in combination, such as sodium chloride in the wood chips from which the pulp is formed, arising from the floating of logs or sea water, sodium chloride contamination in pulp mill chemicals and sodium chlordie contamination in water utilized in the pulp mill.

SUMMARY OF INVENTION

In accordance with the present invention, a solid mixture of sodium carbonate, sodium chloride and sodium sulphate is formed as, or separated from, the smelt formed in a pulp mill recovery operation wherein sodium chloride is introduced from at least one source thereof, is leached at an elevated temperature to recover substantially all of the sodium chloride values therefrom and leave a solid mixture of sodium carbonate and sodium sulphate substantially free from sodium chloride, the resulting aqueous solution of sodium chloride is coled to deposit substantially pure sodium chloride therefrom, the deposited sodium chloride is separated and the sodium carbonate of the solid mixture is converted to active pulping chemical for recycle.

The quantity of sodium chloride present in the solid mixture subjected to leaching depends on the source of the sodium chloride. Typically, the bulk thereof is provided by bleach plant effluent where a liquid-effluent-free mill is used and the quantity depends on the bleaching sequence employed. In a typical procedure where a mixture of chlorine dioxide and chlorine are utilized in the first stage of a CEDED sequence the quantity of sodium chloride may vary between about 120 and 160 lbs/ton of pulp, depending on the proportion of chlorine dixoide used.

Where in invention is carried out on a sodium sulphide-containing smelt, the smelt first is fractionated to separate the sodium sulphide values from the solid mixture of sodium carbonate, sodium chloride and sodium sulphate.

The manner of achieving the fractionation of the smelt is not critical is this invention. In one embodiment, the smelt may be leached to remove therefrom substantially all the sodium sulphide values and leave a solid mixture consisting substantially of sodium carbonate, sodium chloride and sodium sulphate. The resulting aqueous sodium sulphide solution containing some dissolved sodium carbonate, sodium chloride and sodium sulphate values of the smelt is recycled to provide at least one of the pulping chemicals.

As an alternative, the smelt may be dissolved in aqueous material to provide an aqueous solution of the components. The resulting aqueous solution is concentrated, typically by boiling, to deposit a mixture of sodium carbonate, sodium chloride and sodium sulphate. The deposited mixture is removed for manipulation in accordance with this invention and the sodium sulphide solution is recycled to the pulping step.

DESCRIPTION OF PREFERRED EMBODIMENTS

Figure 1:
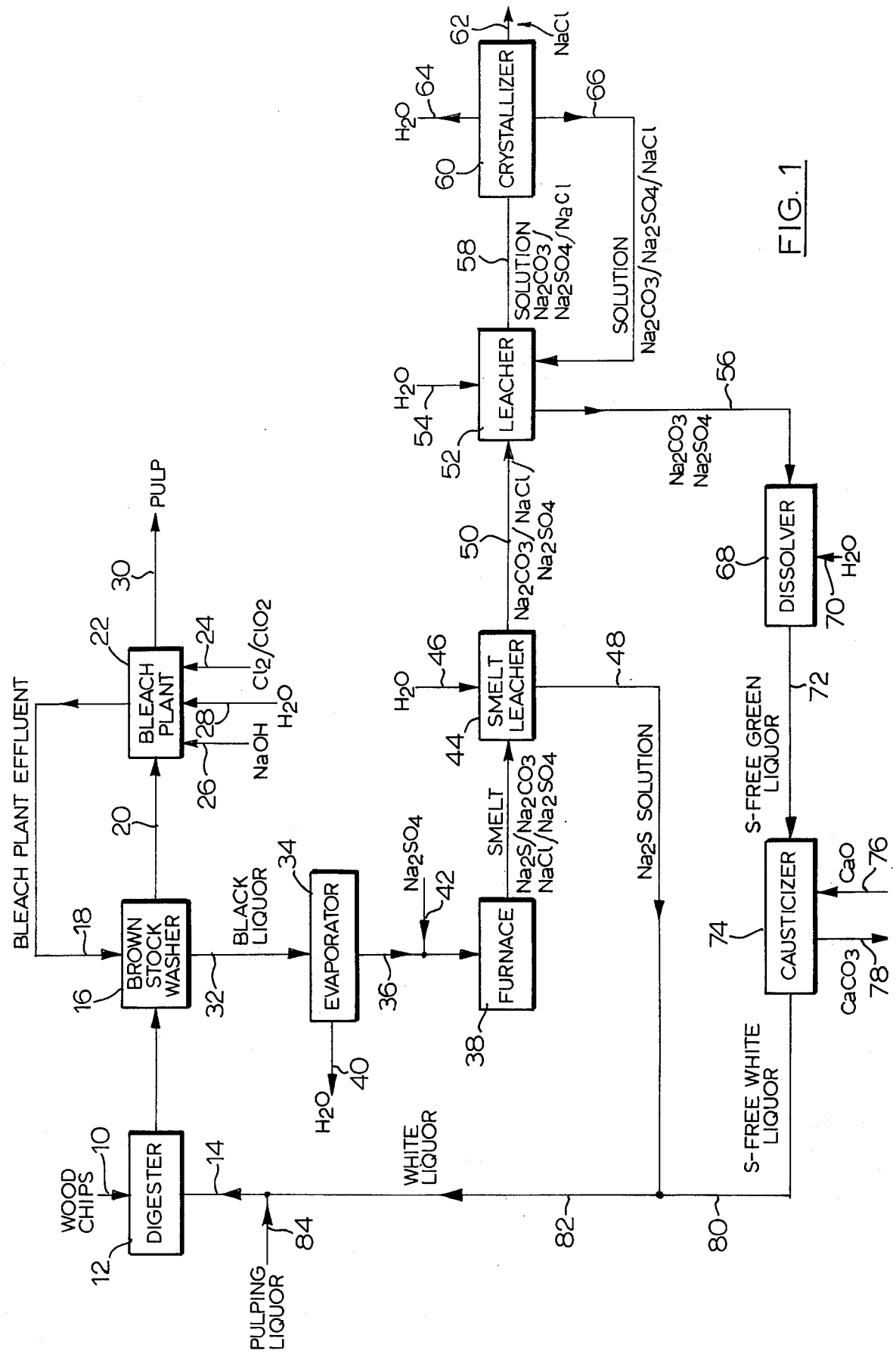
FIG. 1 is a schematic flow sheet of one embodiment of the invention integrated with a Kraft pulp mill operation.

Referring first to FIG. 1, wood chips, or other raw cellulosic fibrous meterial, are fed by line 10 to a digester 12 wherein the wood chips are digested with a pulping liquor fed by line 14 and containing sodium sulphide and sodium hydroxide as the active pulping chemicals, and hence utilizing the Kraft process.

The resulting pulp and black liquor are separated and the pulp is washed in a brown stock washer 16. The pulp is washed, in the embodiment illustrated, with aqueous bleach plant effluent fed by line 18. Alternatively, the pulp may be washed with water or "contaminated condensate", and the bleach plant effluent may be utilized elsewhere in the system, as described in more detail below. In order to avoid the formation of hydrogen sulphide during this washing step when the bleach plant effluent is used, it is preferred to provide the bleach plant effluent at neutral or slightly alkaline pH, typically around pH 9.

The washed and unbleached pulp is fed by line 20 to a bleach plant 22 wherein the pulp is subjected to a series of bleaching and purification processes involving the use of one or more chlorine-containing bleaching agents. Generally, the bleaching and purification processes involve bleaching with chlorine, chlorine dioxide or mixtures thereof fed by line 24 and purification by caustic extraction, using aqueous sodium hydroxide solution fed by line 26, typically in a CEDED sequence. The pulp is washed during the bleach plant operations, typically after each bleaching or caustic extracton operation, by water fed by line 28. The spent wash water from the bleach plant washing operations together with the spent chemicals from the bleaching and caustic extraction steps provide the bleach plant effluent in line 18.

preferably, the washing operations involve countercurrent flow of pulp and wash water through the bleach plant. Preferably, the quantity of sodium hydroxide used in the caustic extraction of the pulp is slightly in excess of the stoichiometric requirement of one sodium atom for each chlorine atom in the bleaching chemicals, whereby the bleach plant effluent in line 18 has an alkaline pH, as mentioned above. The bleached and purified pulp of required brightness is recovered from the bleach plant 22 by line 30 and is passed to paper making procedures.

If desired, the bleach plant effluent in line 18 may be added directly to the black liquor in line 32, although this procedure may be less preferred, since the overall water requirement thereby is increased.

The bleach plant effluent in line 18 contains considerable quantities of sodium chloride which are transferred to the black liquor in line 32. The black liquor is evaporated in an evaporator 34 prior to passage by line 36 to a furnace 38 of any convenient construction. The water recovered from the evaporator 34 by line 40 may be used to provide at least part of the water requirement of the system, for example, as at least part of the water fed to the bleach plant in line 28, after suitable cleaning, if required.

Sodium sulphate, or other source of sodium- and sulphur-values, such as spent acid, is added to the black liquor in the furnace 36, typically by addition by line 42 to the evaporated liquor in line 36. The sodium sulphate, which may be added in solid, slurry or aqueous solution form, is used to make up the sodium and sulphur values lost from the system in the chemical recovery and regeneration processing steps.

The black liquor forms in the furnace 38 a smelt containing sodium sulphide and sodium carbonate, and additionally unreacted components, consisting of sodium chloride and sodium sulphate and other sodium sulphur-oxygen salts. The quantity of sodium sulphate and other sodium sulphur-oxygen salts present in the smelt depends on the efficiency of the furnacing operation.

Thus, there is obtained from the furnacing operation a smelt containing sodium sulphide, sodium carbonate, sodium chloride and sodium sulphate. This smelt is subjected to various operations in accordance with the present invention to remove sodium chloride.

The smelt first is leached at an elevated temperature in a smelt leacher 44 by water fed by line 46 to dissolve substantially all the sodium sulphide values from the smelt. The water used in line 46 may be constituted by "weak wash" water from the washing of calcium carbonate mud following causticization.

The resulting sodium sulphide solution in line 48 usually contains some dissolved sodium carbonate, sodium sulphate and sodium chloride values but the bulk thereof remains as undissolved solids which are passed by line 50 to a leacher 52. The sodium sulphide solution in line 48, after dilution, if desired, is used to form recycle pulping liquor, as described in more detail below.

The smelt leaching step is carried out at an elevated temperature, typically from 120°F to the boiling point of the soluton. The quantity of water used in the smelt leaching is maintained at a level to produce a high concentration of sodium sulphide in the sodium sulphide solution of line 48, in order to inhibit the dissolving of large quantities of sodium chloride in the sodium sulphide solution. Typically, the sodium sulphide concentration is in the range of about 20 to about 45%.

While two separate leachers 44 and 52 are illustrated, this is for the sake of convenience in ease of illustration. A single leacher may be used, if desired, the leaching steps being carried out sequentially.

In the leacher 52, the solid mixture of sodium carbonate, sodium sulphate and sodium chloride is leached with water fed by line 54 and recycle liquor at an elevated temperature to remove substantially all the sodium chloride values from the solid mixture and leave a solid mixture of sodium carbonate and sodium sulphate in line 56.

The leaching in the leacher 52 is carried out at a high temperature, preferably close to the boiling point since the solubility of sodium carbonate relative to sodium chloride is lower than at lower temperatures, although lower temperatures down to about 160°F may be used. The use of such lower temperatures increases the volume of recycle liquor in line 66 due to the greater solubility of sodium carbonate and sodium sulphate relative to sodium chloride at such lower tempertures.

In some instances, larger than desired quantities of sodium carbonate and sodium sulphate may be dissolved from the solids in the leaching step, in which event some boiling of the solution may be carried out to deposit a mixture of sodium carbonate and sodium sulphate. The hot aqueous sodium chloride solution, after removal of the deposited mixture may be manipulated as described below with reference to the hot aqueous sodium chloride solution resulting from the leaching in leacher 52.

While it is less preferred in view of the larger quantity of solids involved and hence the large volume of liquid requiring evaporation, it is possible to dissolve the solid mixture from line 50 in aqueous medium, followed by boling of the resulting solution to deposit a mixture of sodium carbonate and sodium sulphate, which is removed in equivalent manner to the solid mixture in line 56 and leave hot aqueous sodium chloride solution. The latter hot aqueous sodium chloride solution may be manipulated as described below with reference to the hot aqueous sodium chloride solution resulting from the leaching in leacher 52.

The hot sodium chloride solution resulting from the leacher 52 and containing some dissolved sodium carbonate and sodium sulphate values, arising from the recycle stream, is passed by line 58 to a crystallizer 60 wherein the hot sodium chloride solution is cooled to deposit substantially pure sodium chloride therefrom wich is recovered by line 62. The liquor may be evaporated, if desired, during this cooling, the water vapor being removed by line 64.

The temperature to which the sodium chloride solution is cooled to deposit pure sodium chloride therefrom depends to some extent on the temperature of the hot solution in line 58. Typically, the solution may be cooled to a temperature of about 65° to about 170°F.

Generally, the temperature to which the solution is cooled relative to the initial temperature of the solution depends on a number of factors, including yield and purity of sodium chloride required and degree of recirculation which can be tolerated.

In the present invention, in order to promote steady state conditions throughout the mill, it is preferred to remove a quantity of pure sodium chloride in line 62 substantially equal to that introduced to the pulp mill. This quantity is equal to the quantity of sodium chloride present in the smelt less any sodium chloride recycling with the sodium sulphide solution in line 48.

The cool mother liquor from the crystallization of sodium chloride in the crystallizer 60 containing residual quantities of sodium chloride and the sodium carbonate and sodium sulphate values of the solution 58 is recycled by line 66 to the leacher 52.

The procedure normally is operated so that the quantities of sodium carbonate and sodium sulphate recycling between the leacher 52, crystallizer 60 and back to the leacher 52 is substantially constant, so that the quantities of sodium carbonate and sodium sulphate in line 56 are substantially those in the solid mixture in line 50.

The mixture of sodium carbonate and sodium sulphate in line 56 is fed to a dissolver 68 wherein it is dissolved in water fed by line 70 to form sulphide-free green liquor which passes by line 72 to a causticizer 74 wherein substantially all the sodium carbonate values are converter substantially completely to sodium hydroxide by lime fed to the causticizer 74 through line 76. The calcium carbonate mud precipitated in the causticizer 74 is separated from the resulting sulphide-free white liquor and is forwarded by line 78 to a lime kiln for formation of further amounts of lime.

The leach temperature utilized ensures that the sodium carbonate in line 56 is in the form of the anhydrous or monohydrate salt. Passage of the solium carbonate salt in this form to the recausticization procedure removes little or not water to the causticization system, and hence a water balance in the mill may be achieved.

The calcuim carbonate mud is washed with water to remove entrained amounts of white liquor prior to passage to the lime kiln. The spent wash water from the latter washing is the weak wash which may be used to leach the smelt in the smelt leacher 44, or may be used to dissolve the sodium carbonate in line 56.

The sulphide-free white liquor, consisting of an aqueous solution of sodium hydroxide containing sodium sulphate and uncausticized sodium carbonate, is passed by line 80 to mix with the sodium sulphide solution in line 48, with suitable dilution, if required, to provide the desired proportion of sodium sulphide to sodium hydroxide to form a white liquor in line 82 containing sodium sulphide and sodium hydroxide, which is recycled to form at least part of the pulping liquor in line 14, any additional quantities being provided by line 84.

The sulphide-free white liquor in line 80 may be used wholly or in part in other manners. For example, the sulphide-free white liquor in line 80 may be fed to the bleach plant 22 as at least part of the caustic extraction liquor fed by line 26 thereto. Where the bleach plant 22 includes at least one oxygen bleaching step, the sulphide-free white liquor in line 80 may be utilized to provide the sodium hydroxide for the oxygen bleaching step.

The presence of residual quantities of sodium chloride and unregenerated pulping chemicals in the recycled white liquor in line 82 usually is not disadvantageous since the sodium sulphate and other sodium- and sulphur-compound values are used in the furnance 38 and the sodium carbonate values are cycled in the system to the causticizer 74. Any sodium chloride values in the white liquor in line 82 cycle through the system and while it is a dead load, under steady state conditions the quantity remains substantially constant since the quantity removed in the crystallizer 60 is approximately equal to the amount of sodium chloride introduced to the system. Therefore, while the white liquor in line 82 contains a dead load of non-active chemicals, this dead load, under steady state conditions, is substantially constant and hence does not impair the operation to any significant degree.

The pure sodium chloride which is recovered by line 62 may be put to a variety of uses. Typically, the sodium chloride is utilized to regenerate bleach plant chemicals. For example, the sodium chloride may be used to generate sodium hydroxide and chlorine by electrolysis of an aqueous solution thereof, the sodium hydroxide being used in the bleach plant in line 26 and the chlorine being used in line 24. Alternatively, the sodium chloride may be used to generate chlorine dioxide and chlorine by reaction with sodium chlorate and sulphuric acid, the chlorine dioxide and chlorine being fed to the bleach plant by line 24. Further, the sodium chloride may be electroylzed as an aqueous solution to sodium chlorate for use in a chlorine dioxide producing reaction involving reduction of the sodium chlorate in an acid medium.

The procedure of the embodiment of FIG. 1 therefore is able to remove sodium chloride in solid, substantially pure and readily reusable form without loss of any utilizable chemicals and without upsetting the water balance of the system, in complete contrast to the prior art.

Figure 2:
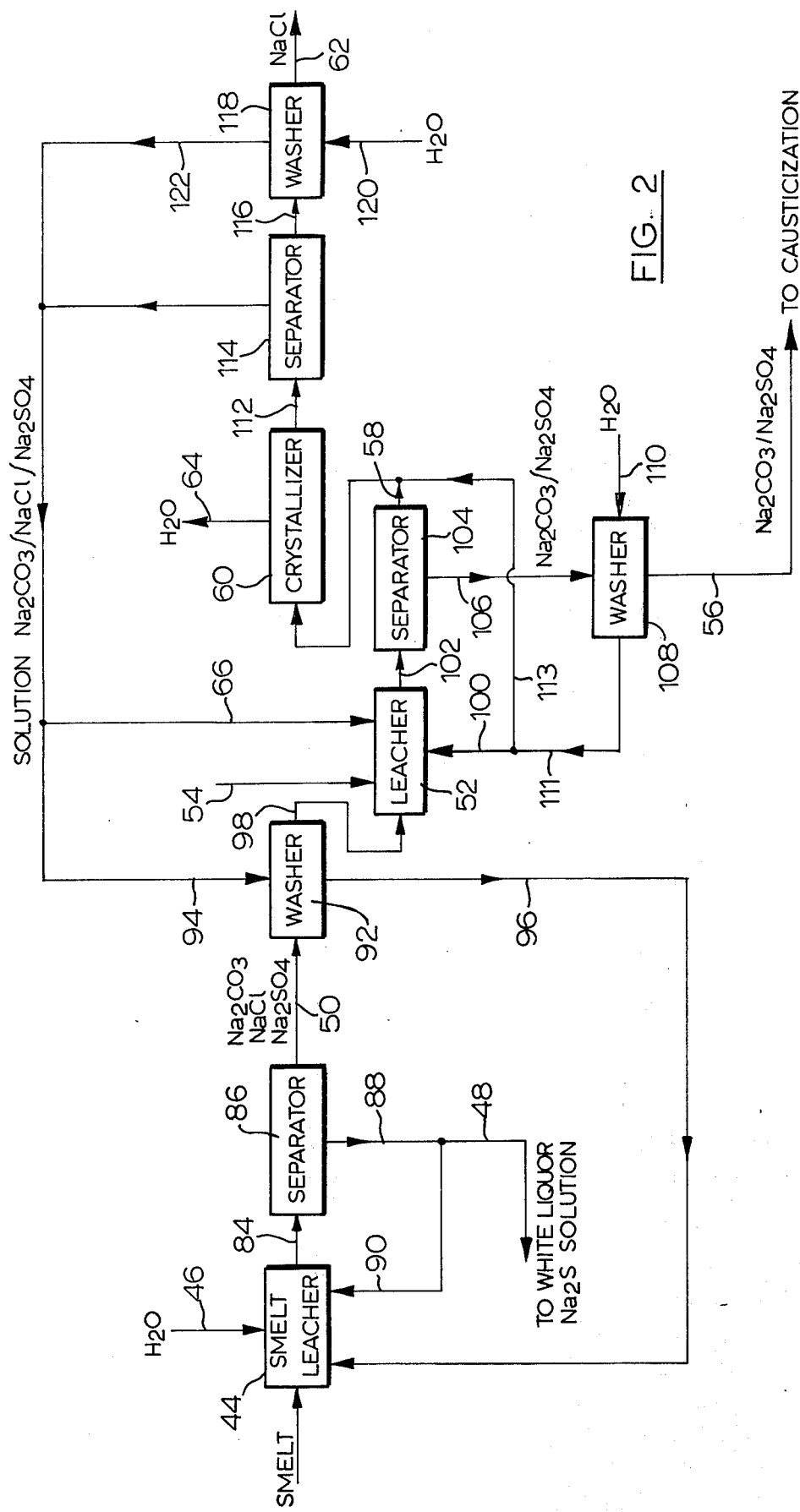
FIG. 2 is a schematic flow sheet of a modification of the embodiment of FIG. 1.

In the modification of the embodiment of FIG. 1 shown in FIG. 2 there is illustrated only the smelt manipulation procedures. It will be understood that the pulp mill operation as described above in connection with the embodiment of FIG. 1 may be utilized equally with the modification of FIG. 2.

In the modification of FIG. 2, there is shown a washing procedure which may be adopted with the embodiment of FIG. 1 to avoid the build up of entrapped chemicals, notably sodium sulphide, in the recycle stream 66 which may occur due to washing inefficiencies. The same reference numerals are used to designate items in common with FIG. 1.

As shown in this modification, following leaching of the smelt in the leacher, the resulting slurry is passed by line 84 to a separator 86, typically a filter, wherein the solids are separated from the sodium sulphide solution, the latter being removed by line 88. Part of the sodium sulphide solution in line 88 may be recycled to the leacher 44 by line 90 to increase the sulphide concentration therein, the remainder passing by line 48 to white liquor formation.

The solid mixture of sodium carbonate, sodium chloride and sodium sulphate separated from the sodium sulphide solution in the separator 86 is passed by line 50 to a washer 92 wherein any entrained sodium sulphide is removed substantially completely from the solids by washing with part of the recycle liquor of line 66 in line 94, the spent wash water being passed to the leacher 44 by line 96 to form part of the leach liquor in line 46.

The washed solid is passed by line 98 to the leacher 52 wherein it is contacted with water fed by line 54, recycled solution fed by line 66 and spent wash water fed by line 100.

The resulting slurry is fed by line 102 to a separator 104, typically a filter, wherein the sodium carbonate and sodium sulphate are separated from the sodium chloride solution, the solids being passed by line 106 to a washer 108 wherein the solids are contacted with water fed by line 110 to remove any entrained soldium chloride solution.

The spent wash water from the washer 108 is passed by line 111 wholly to the leacher 52 by line 100, or partly by lines 111 and 100 to the leacher 52 and partly by lines 111 and 113 to the sodium chloride solution in line 58, while the washed mixture of sodium carbonate and sodium sulphate is passed by line 56 to causticization.

Following crystallization of pure sodium chloride in the crystallizer 60, the slurry is forwarded by line 112 to separator 114 wherein the solid sodium chloride is separated from the mother liquor and passed by line 116 to a washer 118. The mother liquor is recycled by line 66 to the leacher 52.

The sodium chloride is washed in the washer 118 by water fed by line 120 to remove entrained liquor before discharge of the washed substantially pure sodium chloride by line 62. The spent wash water in line 122 is discharged to the recycle stream in line 66.

The washing procedure outlined in FIG. 2 and described above avoids the accummulation of sodium sulphide in the recycle stream 66. Thus, sodium sulphide entrapped in the mixture of sodium chloride, sodium carbonate and sodium sulphate in line 50 is at least partially removed by the recycle stream wash water in line 94, the washed sodium sulphide values being retained within the mill by recycle in line 96 to the smelt leacher 44 and ultimately to the sodium sulphide solution in line 48.

Any sodium sulphide values remaining are present in the recycle stream 66, the bleed in line 94 preventing the build up of this sodium sulphide in the recycle stream 66. The presence of the remaining sodium sulphide in the recycle stream 66 arises from sodium sulphide not removed in washer 92, sodium sulphide washed from the sodium carbonate and sodium sulphate in the washer 110 and recycled directly or indirectly to line 58, and sodium sulphide washed from the sodium chloride in the washer 118.

The washing of the sodium carbonate and sodium sulphate in the washer 110 also serves to remove any entrained sodium chloride values from the mixture, the thereby-removed sodium chloride values being returned to the sodium chloride solution.

The washing of the sodium chloride in the washer 118 also removes entrained recycle solution, the removed solution being returned to the recycle stream by line 122. The fresh water added by lines 110 and 120 may be balanced by the water removed by line 64 during the cooling crystallization of sodium chloride, wash water used in line 94 and water of crystallization of the sodium in line 56.

Figure 3:
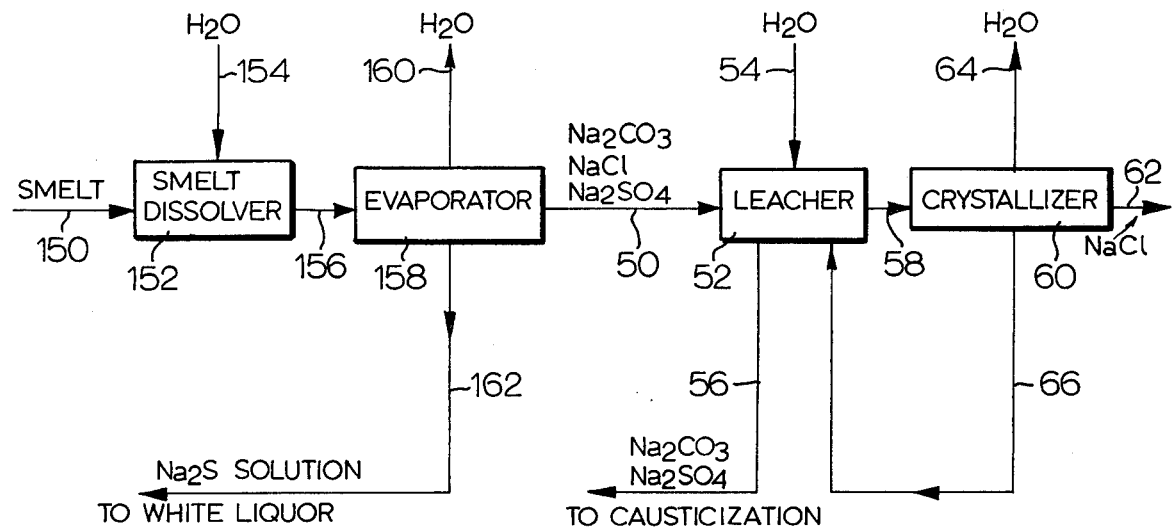
FIG. 3 is a schematic flow sheet of a second embodiment of the invention.

The embodiment of FIG. 3 illustrates an alternative manner of fractionating the smelt. As in the case of the embodiment of FIG. 2, only the smelt manipulation procedures are illustrated. The pulp mill operation described above in connection with FIG. 1 may be utilized equally with the modificaton of FIG. 3. Elements in common with those of FIG. 1 are referred to by the same numerals in FIG. 3.

In the embodiment of FIG. 3, the smelt in line 150 is dissolved in a smelt dissolver 152 in water fed by line 154, resulting in an aqueous solution of the smelt components in line 156. The aqueous solution of the smelt components is boiled in an evaporator 158 to deposit as solid mixture of sodium carbonate, sodium chloride and sodium sulphate from the solution. The water evaporated is removed by line 160 and collected for reuse elsewhere in the system.

The concentration of the aqueous solution of the smelt components may be carried out at a temperature of from about 120°F up to about 280°F, with sub- or super-atmospheric pressure being used as desired. The sodium sulphide concentration of the aqueous solution is manintained at a high value, typically in the range of about 20 to about 45%, in order to induce the precipitation of a high proportion of the sodium chloride content of the aqueous solution.

The concentrated sodium sulphide solution, generally containing some dissolved sodium carbonate, sodium chloride and sodium sulphate values, is removed by line 162 to form white liquor for recycle to the digester, in analogous manner to the sodium sulphide solution in line 48 in FIG. 1.

The precipitated mixture of sodium carbonate, sodium chloride and sodium sulphate is passed by line 50 for manipulation to recover pure sodium chloride in line 62, as described in more detail above in connection with FIG. 1.

Figure 4:
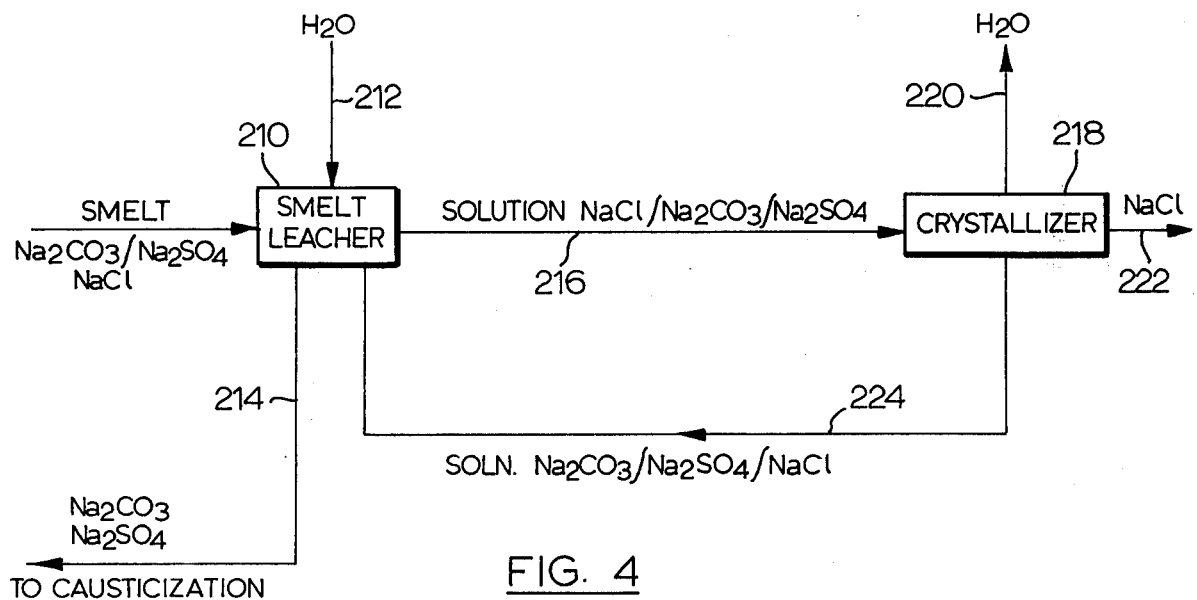
FIG. 4 is a schematic flow sheet of a third embodiment of the invention for integration with a soda pulp mill operation.

Turning now to the embodiment of FIG. 4, there is shown the application of the present invention to a soda mill, although only the smelt manipulation procedures are illustrated therein. Integration of the procedure with a soda pulp mill operation may be readily achieved, utilizing, for example, the procedure of FIG. 1, suitably modified for the absence of sodium sulphide. The smelt in this embodiment consists mainly of sodium carbonate and sodium chloride, together with very minor amounts of sodium sulphate. Sodium sulphide, however, is wholly absent.

The smelt first is leached in a leacher 210 at high temperature by water fed by line 212 to dissolve the sodium chloride values therefrom and leave a mixture of sodium carbonate and sodium sulphate which is passed by line 214 to causticization, as described above in connection with the embodiment of FIG. 1. In this embodiment, the sodium hydroxide solution resulting from the recausticization is recycled directly to provide at least part of the pulping liquor.

The leaching of the smelt usually is carried out at a temperature as close to boiling as possible. Lower temperatures down to about 160° F may be utilized, if desired.

The hot leach liquor from the smelt leacher 210 is passed by line 216 to a crystallizer 218 wherein the leach liquor is cooled to cause deposition of substantially pure sodium chloride therefrom. Evaporation of water from the solution during the cooling may be carried out, if desired, the water vapor being removed by line 220.

The temperature to which the solution is cooled depends on the smelt leaching temperature utilized. Generally, the solution may be cooled to a temperature within the range of from about 65° to about 170° F.

The solid sodium chloride is removed by line 222 and may be utilized in a variety of ways, as discussed in more detail above in connection with the sodium chloride removed by line 62 in the embodiment of FIG. 1.

The mother liquor from the recrystallization is recycled by line 224 to the smelt leacher 210, to contact the solid mixture therein.

In an effluent-free soda mill, it may be desired to balance the sodium sulphate input in order to avoid its build up.

EXAMPLES

The invention is illustrated further by the following examples

EXAMPLE I

A study of the relative solubilities of the components of the system $Na_2S$-$NaCl$-$Na_2Co_3$-$Na_2SO_4$-$H_2O$ at various temperatures and sulphide concentration was undertaken with a view to determining the desired condition for smelt fractionation. Small quantities of sodium hydroxide were present in the liquors. The following Table gives the results of the study:

TABLE

| Temperature °F | $Na_2S$ | NaOH | NaCl wt. % | $Na_2CO_3$ | $Na_2SO_4$ |
|---|---|---|---|---|---|
| 120 | 24.8 | 0.3 | 4.38 | 1.07 | 0.20 |
| 131 | 21.8 | 0.1 | 6.44 | 1.51 | 0.19 |
| 212 | 22.4 | 0.21 | 7.43 | 1.63 | 0.17 |
| 212 | 35.4 | 0.7 | 2.27 | 0.41 | 0.11 |
| 235 | 22.7 | 0.3 | 7.51 | 2.08 | 0.22 |
| 243.5 | 26.7 | 0.7 | 5.73 | 1.09 | 0.23 |
| 266.5 | 36.3 | 1.6 | 2.92 | 0.88 | 0.16 |

It will be seen from the above results that high temperatures and high sodium sulphide concentrations favour the fractionation of sodium sulphide while avoiding the presence of substantial quantities of other components in the sodium sulphide solution.

EXAMPLE II

Based on the solubility data of Example I and the known solubility data for the system $Na_2CO_3$-$NaCl$-$Na_2SO_4$-$H_2O$, a mass balance was calculated for an approximately 500 ton/day pulp mill utilizing the smelt treatment procedure of FIG. 1.

24,908 lbs/hr of a smelt containing 16,863 lbs of sodium carbonate, 4010 lbs of sodium sulphide, 3412 lbs. of sodium chloride and 623 lbs of sodium sulphate is leached at 100° C with 7113 lbs/hr of water to provide 11,457 lbs/hr of a sodium sulphide solution (line 48) containing 57 lbs of sodium carbonate, 4010 lbs of sodium sulphide, 264 lbs of sodium chloride, 13 lbs of sodium sulphate and 7113 lbs of water.

20,564 lbs/hr of a solid mixture containing 16,806 lbs of sodium carbonate, 3148 lbs of sodium chloride and 610 lbs of sodium sulphate (line 50) is leached at 100° C with 9326 lbs/hr of water and 25,750 lbs/hr of recycle solution containing 3502 lbs of sodium carbonate, 4598 lbs of sodium chloride, 424 lbs of sodium sulphate and 17,226 lbs of water.

The leaching results in 20,270 lbs/hr of a solid mixture of 16,806 lbs of sodium carbonate, 610 lbs of sodium sulphate and 2854 lbs of water of crystallization, which is passed to causticization (by line 56).

The 35,370 lbs/hr of sodium chloride solution (line 58) also results from the leaching step and contain 3502 lbs of sodium carbonate, 7746 lbs of sodium chloride, 424 lbs of sodium sulphate and 23,698 lbs of water. The latter solution is cooled to 50° C while 6472 lbs/hr of water are evaporated, resulting in the deposition of 3148 lbs/hr of sodium chloride (line 62). The resulting mother liquor is recycled (line 66) to the sodium chloride leach step.

EXAMPLE III

Based on available solubility data for the system $Na_2CO_3$-$NaCl$-$Na_2SO_4$-$H_2O$, a mass balance was calculated for the embodiment of FIG. 3 for a 500 ton/day pulp mill.

20,634 lbs/hr of a smelt containing 16,863 lbs of sodium carbonate, 3148 lbs of sodium chloride and 623 lbs of sodium sulphate is leached at 100° C with 9336 lbs/hr of water and 25,750 lbs/hr of recycle liquor containing 3502 lbs of sodium carbonate, 4598 lbs of sodium chloride, 424 lbs of sodium sulphate and 17,226 lbs of water. 20350 lbs/hr of solids containing 16,863 lbs of sodium carbonate, 623 lbs of sodium sulphate and 2864 lbs of water of crystallization result from the leaching and are forwarded to recausticization (by line 214).

35,370 lbs/hr of a sodium chloride solution containing 3502 lbs of sodium carbonate, 7746 lbs of sodium chloride, 424 lbs of sodium sulphate and 23,698 lbs of water is cooled to 50° C with the evaporation of 6472 lbs of water, resulting in deposition of 3148 lbs/hr of sodium chloride (line 222). After removal of the deposited sodium chloride, the 25,750 lbs/hr of recycle liquor is recycled (by line 224) to the leaching.

SUMMARY

The procedure of the present invention therefore is capable of removing sodium chloride from pulp mill systems without loss of active chemicals and in quantities equivalent to that introduced to the pulp mill.

Modifications are possible within the scope of the invention.

We claim:

1. In a pulp mill process which comprises digesting cellulosic fibrous material with a pulping liquor containing sodium hydroxide and sodium sulphide as the pulping chemicals separating pulped material from spent pulping liquor, introducing sodium chloride to said spent pulping liquor, forming a smelt containing sodium sulphide, sodium carbonate and sodium sulphate from said spend pulping liquor, fractionating said smelt to form an aqueous sodium sulphide solution and a solid mixture of sodium carbonate, sodium sulphate and sodium chloride substantially free from sodium sulphide, and recycling said aqueous sodium sulphide solution to said digestion step to provide at least part of said sodium sulphide in said pulping liquor, the improvement which comprises forming from said solid mixture (1) a hot aqueous sodium chloride solution having a temperature such that subsequent cooling of said sodium chloride solution precipitates substantially pure sodium chloride therefrom and (2) a solid mass of sodium carbonate in anhydrous or monohydrate form and sodium sulphate substantially free from sodium chloride, separating said solid mass from said hot aqueous sodium chloride solution, forming an aqueous solution of said solid mass, converting at least a substantial proportion of the sodium carbonate in the aqueous solution of said solid mass to sodium hydroxide, cooling said hot aqueous sodium chloride solution after said separation of said solid mass therefrom to cause precipitation of substantially pure sodium chloride therefrom, and removing said precipitated substantially pure sodium chloride from the resulting mother liquor.

2. The process of claim 1 including recycling the sodium hydroxide solution to said digestion step to provide at least part of said sodium hydroxide in said pulping liquor.

3. The process of claim 1 wherein said formation of hot aqueous sodium chloride solution and a solid mass of sodium carbonate and sodium sulphate is achieved by leaching said solid mixture with an aqueous medium at an elevated temperature to dissolve substantially completely said sodium chloride therefrom thereby to form said hot aqueous sodium chloride solution and leave said solid mass of sodium carbonate and sodium sulphate.

4. The process of claim 3, wherein said leaching of said solid mixture is carried out at a temperature of about 160° F up to the boiling point of the hot aqueous sodium chloride solution.

5. The process of claim 3 including recycling said mother liquor to provide at least part of the aqueous medium leaching said solid mixture.

6. The process of claim 1 wherein said fractionation of said smelt is carried out by leaching said smelt with an aqueous medium to remove substantially all the sodium sulphide values therefrom to form said aqueous sodium sulphide solution and leave said solid mixture of sodium carbonate, sodium sulphate and sodium chloride substantially free from sodium sulphide.

7. The process of claim 6, wherein said leaching of said smelt is carried out at a temperature from about 120° F up to the boiling point of the sodium sulphide solution.

8. The process of claim 7, wherein said smelt leaching is carried out with sufficient aqueous medium to provide an $Na_2S$ concentration in said sodium sulphide solution of about 20 to about 45%.

9. The process of claim 1 wherein said fractionation of said smelt is carried out by dissolving said smelt in an aqueous medium, boiling the resulting aqueous solution to deposit a solid mixture of sodium carbonate, sodium chloride and sodium sulphate therefrom, and separating said deposited solid mixture from the resulting sodium sulphide solution.

10. The process of claim 9 wherein said boiling is carried out at a temperature of from about 120° F up to about 280° F.

11. The process of claim 10 wherein the solution of the smelt has a sodium sulphide concentration of about 20% to about 45%.

12. The process of claim 1, wherein said hot sodium chloride solution is cooled to a temperature of about 65° to about 170° F to cause said precipitation of substantially pure sodium chloride therefrom.

13. The process of claim 12, including evaporating water from said sodium chloride solution during said cooling step.

14. The process of claim 6, wherein said smelt leaching is carried out at a temperature of about 120° F up to the boiling point of said sodium sulphide solution, said formation of hot aqueous sodium chloride solution and a solid mass of sodium carbonate and sodium sulphate is achieved by leaching said solid mixture with an aqueous medium at an elevated temperature to dissolve substantially completely said sodium chloride therefrom to form said hot aqueous sodium chloride solution and leave said solid mass of sodium carbonate and sodium sulphate, said leaching of said solid mixture being carried out at a temperature of about 160° F up to the boiling point of the hot aqueous sodium chloride solution, and said cooling of said hot sodium chloride solution is carried out at a temperature of about 65° to about 170° F.

15. The process of claim 9, wherein said boiling is carried out at a temperature of about 120° F up to about 280° F, said formation of hot aqueous sodium chloride solution and a solid mass of sodium carbonate and sodium sulphate is achieved by leaching said solid mixture with an aqueous medium at an elevated temperature to dissolve substantially completely said sodium chloride therefrom to form said hot aqueous sodium chloride solution and leave said solid mass of sodium carbonate and sodium sulphate, said leaching of said solid mixture being carried out at a temperature of about 160° F up to the boiling point of the hot aqueous sodium chloride solution, and said cooling of said hot sodium chloride solution is carried out at a temperature of about 65° to about 170° F.

16. A pulp mill process which comprises digesting cellulosic fibrous material with a pulping liquor containing sodium hydroxide and sodium sulphide as the pulping chemicals, separating pulped material from spent pulping liquor, introducing sodium chloride to said spent pulping liquor, forming a smelt containing sodium sulphide, sodium carbonate, sodium chloride and sodium sulphate from said spent pulping liquor, fractionating said smelt to form an aqueous sodium sulphide solution and leave a solid mixture of sodium carbonate, sodium sulphate and sodium chloride substantially free from sodium sulphide, separating said solid mixture from said sodium sulphide solution, washing said separated solid mixture in a first washing step with a first wash water, utilizing spent wash water from said first washing step in said smelt fractionation, recycling at least a portion of said aqueous sodium sulphide solution to said digestion step to provide at least part of said sodium sulphide in said pulping liquor, leaching the washed solid mixture with an aqueous medium to dissolve substantially completely said sodium chloride therefrom thereby to form a hot aqueous sodium chloride solution and leave a solid mass of sodium carbonate in anhydrous or monohydrate form and sodium sulphate substantially free from sodium chloride, said leaching being carried out at an elevated temperature such that said hot aqueous sodium chloride solution precipitates substantially pure sodium chloride therefrom on cooling, separating said solid mass from said hot aqueous sodium chloride solution, washing said separated solid mass in a second washing step with a second wash water, utilizing a least part of the spent wash water from said second washing step in said leaching step, forming an aqueous solution of the washed solid mass, converting at least a substantial proportion of the sodium carbonate in the aqueous solution of the solid mass to sodium hydroxide, recycling at least a portion of the resulting sodium hydroxide solution to said digestion step to provide at least part of said sodium hydroxide in said pulping liquor, cooling said hot aqueous sodium chloride solution while evaporating water therefrom to cause precipitation of substantially pure sodium chloride therefrom, removing said precipitated substantially pure sodium chloride from the resulting mother liquor, washing said removed sodium chloride in a third washing step with a third wash water, adding the spent wash water from said third washing step to said mother liquor after removal of said precipitated sodium chloride therefrom and recycling said mother liquor partly to provide said first wash water and partly to provide part of said aqueous medium leaching said solid mixture.

17. The process of claim 1 wherein said cellulosic fibrous material is wood.

18. The process of claim 17 including subjecting said pulped material to a series of bleaching and purification steps using at least one chlorine-containing bleaching chemical in at least one of said bleaching steps and aqueous sodium hydroxide-containing solutions in said purification steps, discharging a sodium chloride-containing aqueous effluent from said series of bleaching and purification steps into said spent pulping liquor whereby at least part of said sodium chloride is introduced to said spent pulping liquor.

19. The process of claim 18 including washing said pulped material after formation thereof and before passage to said series of bleaching and purification steps and utilizing said sodium chloride-containing aqueous effluent in said washing.

20. In a pulp mill process which comprises digesting a cellulosic fibrous material with a pulping liquor containing sodium hydroxide as the active pulping chemical, separating pulped material from spent pulping liquor, introducing sodium chloride to said pulping liquor and forming a smelt containing sodium carbonate, sodium chloride and sodium sulphate from said spent pulping liquor, the improvement which comprises fractionating said smelt to form (1) a hot aqueous sodium chloride solution having a temperature such that subsequent cooling of said sodium chloride solution precipitates substantially pure sodium chloride therefrom and (2) a solid mass of sodium carbonate in anhydrous or monohydrate form and sodium sulphate substantially free from sodium chloride, separating said solid mass from said hot aqueous sodium chloride solution, forming an aqueous solution of said mass, converting at least a substantial proportion of the sodium carbonate in the aqueous solution of said mass to sodium hydroxide, recycling the resulting sodium hydroxide solution to said digestion step to provide at least part of said sodium hydroxide in said pulping liquor, cooling said hot aqueous sodium chloride solution after said separation of said solid mass therefrom to cause precipitation of substantially pure sodium chloride therefrom, and removing said precipitated substantially pure sodium chloride from the resulting mother liquor.

21. The process of claim 20 wherein said smelt fractionation is achieved by leaching said smelt with an aqueous medium at an elevated temperature to dissolve substantially completely said sodium chloride therefrom to form said hot aqueous sodium chloride solution and leave said solid mass of sodium carbonate and sodium sulphate.

22. The process of claim 21 including recycling said mother liquor to provide at least part of the aqueous medium leaching said smelt.

23. The process of claim 21 wherein said leaching is carried out at a temperature of about 160° F up to the boiling point of the hot aqueous sodium chloride solution.

24. The process of claim 20 wherein said hot sodium chloride solution is cooled to a temperature of about 65° to about 170° F to cause said precipitation of substantially pure sodium chloride therefrom.

25. The process of claim 24, including evaporating water from said sodium chloride solution during said cooling step.

26. The process of claim 21 wherein said smelt leaching is carried out at a temperature of about 160° F up to the boiling point of the hot aqueous sodium chloride solution and said hot aqueous sodium chloride solution is cooled to about 65° to about 170° F to cause said precipitation of substantially pure sodium chloride therefrom.

27. A pulp mill process which comprises digesting cellulosic fibrous material with a pulping liquor containing sodium hyrdoxide and sodium sulphide as the pulping chemicals, separating pulped material from spent pulping liquor, introducing sodium chloride to said spent pulping liquor, forming a smelt containing sodium sulphide, sodium carbonate, sodium chloride and sodium sulphate from said spent pulping liquor, fractionating said smelt to form an aqueous sodium sulphide solution and a solid mixture of sodium carbonate, sodium sulphate and sodium chloride substantially free from sodium sulphide, recycling said aqueous sodium sulphide solution to said digestion step to provide at least part of said sodium sulphide in said pulping liquor, leaching said solid mixture with an aqueous medium at a temperature of about 160° F up to the boiling point of the resulting hot aqueous sodium chloride solution to dissolve substantially completely said sodium chloride therefrom to form a hot aqueous sodium chloride solution and leave a solid mass of sodium carbonate in anhydrous or monohydrate form and sodium sulphate substantially free from sodium chloride, separating said solid mass from said hot aqueous sodium chloride solution, forming an aqueous solution of said solid mass, converting at least a substantial proportion of the sodium carbonate of said solid mass to sodium hydroxide, recycling the resulting sodium hydroxide solution to said digestion step to provide at least part of said sodium hydroxide in said pulping liquor, cooling said hot aqueous sodium chloride solution after said separation of said solid mass therefrom from the temperature thereof to a temperature of about 65° F to about 170° F to cause precipitation of substantially pure sodium chloride therefrom, removing said precipitated substantially pure sodium chloride from the resulting mother liquor, and recycling said mother liquor to provide at least part of the aqueous medium leaching said solid mixture.

28. The process of claim 27 including subjecting said pulped material to a series of bleaching and purification steps using at least one chlorine-containing bleaching chemical in at least one of said bleaching steps and aqueous sodium hydroxide-containing solutions in said purification steps, and discharging a sodium chloride-containing effluent from said series of bleaching and purification steps into said spent pulping liquor to provide at least part of said sodium chloride introduced to said spent pulping liquor.

29. The process of claim 16 wherein said leaching of said washed solid mixture is carried out at a temperature of about 160° F up to the boiling point of the hot aqueous sodium chloride solution and said cooling is carried out to a temperature of about 65° F to about 170° F.

30. A pulp mill process which comprises digesting a cellulosic fibrous material with a pulping liquor containing sodium hydroxide as the active pulping chemical, separating pulped material from spent pulping liquor, introducing sodium chloride to said pulping liquor and forming a smelt containing sodium carbonate, sodium chloride and sodium sulphate from said spent pulping liquor, leaching said smelt with an aqueous medium at a temperature of about 160° F up to the boiling point of the resulting hot aqueous sodium chloride solution to dissolve substantially completely said sodium chloride therefrom to form a hot aqueous sodium chloride solution and leave a solid mass of sodium carbonate in anhydrous or monohydrate form and sodium sulphate substantially free from sodium chloride, separating said solid mass from said hot aqueous sodium chloride solution, forming an aqueous solution of said mass, converting at least a substantial proportion of the sodium carbonate in the aqueous solution of said mass to sodium hydroxide, recycling the resulting sodium hydroxide solution to said digestion step to provide at least part of said sodium hydroxide in said pulping liquor, cooling said hot aqueous sodium chloride solution after said separation of said solid mass therefrom from the temperature thereof to a temperature of about 65° to about 170° F to cause precipitation of substantially pure sodium chloride therefrom, removing said precipitated substantially pure sodium chloride from the resulting mother liquor, and recycling said mother liquor to provide at least part of said aqueous medium leaching said smelt.

31. The process of claim 30 including subjecting said pulped material to a series of bleaching and purification steps using at least one chlorine-containing bleaching chemical in at least one of said bleaching steps and aqueous sodium hydroxide-containing solutions in said purification steps, and discharging a sodium chloride-containing effluent from said series of bleaching and purification steps into said spent pulping liquor to provide at least part of said sodium chloride introduced to said spent pulping liquor.

* * * * *